US006945735B1

(12) United States Patent
Doverspike

(10) Patent No.: US 6,945,735 B1
(45) Date of Patent: Sep. 20, 2005

(54) ALIGNMENT AND SUPPORT APPARATUS

(76) Inventor: Mark Doverspike, P.O. Box 69808, Odessa, TX (US) 79763

( * ) Notice: Subject to any disclaimer, the term of this patent is extended or adjusted under 35 U.S.C. 154(b) by 0 days.

(21) Appl. No.: 10/817,878

(22) Filed: Apr. 6, 2004

(51) Int. Cl.[7] ............ E02D 11/00; F16L 3/10; F16L 3/12
(52) U.S. Cl. .......... 405/184.4; 248/70; 248/74.1; 248/207; 52/292; 249/11
(58) Field of Search ............ 405/184.4; 248/49, 248/57, 58, 62, 65, 68.1, 70, 74.1, 74.3, 126, 248/207, 218.4, 231, 300; 52/292–298; 249/34, 249/11

(56) References Cited

U.S. PATENT DOCUMENTS

| | | | |
|---|---|---|---|
| 2,276,139 A * | 3/1942 | Anderson et al. ............ 454/331 |
| 3,690,609 A | 9/1972 | Montesdioca .............. 248/68.1 |
| 4,306,697 A | 12/1981 | Mathews .................. 248/68.1 |
| 4,601,447 A | 7/1986 | McFarland .................. 248/49 |
| 4,671,483 A | 6/1987 | Harbeke ..................... 249/91 |
| 4,763,867 A | 8/1988 | Hungerford, Jr. ........... 248/544 |
| 4,907,766 A * | 3/1990 | Rinderer ..................... 248/57 |
| 4,957,251 A | 9/1990 | Hubbard .................... 248/68.1 |
| 5,050,824 A * | 9/1991 | Hubbard .................... 248/57 |
| 5,125,619 A | 6/1992 | Collins .................... 249/219.1 |
| 5,303,887 A | 4/1994 | Hasty et al. ............. 248/68.1 |
| 5,876,000 A | 3/1999 | Ismert ........................ 248/65 |
| 6,047,515 A | 4/2000 | Behlen ....................... 52/699 |
| 6,061,880 A | 5/2000 | Senniger .................... 24/339 |
| 2003/0108130 A1 | 6/2003 | Tucker ........................ 375/345 |

FOREIGN PATENT DOCUMENTS

| | | |
|---|---|---|
| GB | 2249604 | 5/1992 |
| JP | 6-17971 | 1/1994 |

OTHER PUBLICATIONS

"Pipe Clamps & Risers: Fabricated Riser Clamp", website: http://www.sumner.com/s/pipe/posi.html, 3 pages.
"Pipe Support and Alignment—Sumner Manfacturing Company, Inc." http://www.pipingtech.com/products/ptpcat/support/clamp/fig190.htm, 3 pages.
"Pipe Support & Alignment", http://www.sumner.com/s/pipe/posi.html, 2 pages.
Company literature: "Holdrite Pipe Positioning & Alignment Brackets", 4 pages, (Company address: Holdrite, 393 Enterprise Street, San Marcos, CA 92078, Toll Free: 877-Holdrite (465-3748).
Company literature: "*Hubbard Enterprises*", "The Holdrite[R] Stout Bracket™" and other products including "Holdrite[R] Residential Pro Clamps", 5 pages.

* cited by examiner

Primary Examiner—Thomas B. Will
Assistant Examiner—Tara L. Mayo
(74) Attorney, Agent, or Firm—Wood, Ngo & Eisenberg, PLLC

(57) ABSTRACT

An alignment and support device for supporting and maintaining correct alignment of at least one pipe or conduit inside a form board during a concrete pour operation, the device comprising at least two attachment points for holding a pipe or conduit, and at least one attachment bracket, wherein the at least one attachment bracket is capable of attaching the alignment and support device to a form board.

7 Claims, 12 Drawing Sheets

ALIGNMENT AND SUPPORT APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to an alignment and support apparatus for aligning and supporting pipes and the like during a concrete pour operation. More specifically, this invention relates to an apparatus that keeps pipes and the like correctly aligned with respect to a form board during a concrete pour operation.

Many building structures, such as foundations, floors, ceilings, walls, and the like, include a concrete slab having pipes and the like embedded therein. Form boards are typically used to provide the desired shape of concrete slab. The form boards are usually made out of wood, with pipe work and the like supported therein. Concrete is poured into the form, and once set, the form is removed to reveal a concrete slab with pipes and the like embedded therein. It is very important that the pipes and/or conduits do not move during the concrete pouring operation.

For this reason, various apparatus and methods are employed in the construction art to support a desired configuration of pipes inside the wooden form until the concrete (e.g. for a foundation) is poured and has had sufficient time to set or harden, thereby saving space by embedding the pipe work and the like in the concrete. For example, lengths of rebar are driven into the ground and sections of pipe are taped to the rebar to provide structural support to the pipe configuration. Because the rebar and tape are typically removed prior to the pouring of concrete so that footers may be dug, the pipe or pipes will often sag prior to the concrete pour operation, and unless repositioned will result in a plumbing configuration that is permanently crooked when later embedded in cured concrete. Often this sagging results in poor pipe work configuration that causes pipe leaks, water pressure problems, and drainage issues all of which are best avoided by maintaining proper support and alignment of pipe work and the like both prior to and during a concrete pour operation.

U.S. Pat. No. 5,303,887 issued Apr. 19, 1994 to Hasty, deceased, et al, describes a universal pipe support and hanger system comprising a single support member of generally I-shaped cross-section elongated in a first direction between a proximate end and a distal end, and comprising an elongated central web integrally connected with midpoints of first and second flanges extending substantially at right angles to the web, in a second direction. The proximate end has an L-shaped flange for mounting the single support member against a flat surface or a DMV in at least two orthogonal directions. Upper and lower edges of each flange comprise v-shaped cradles to support pipes extending in a third direction. A plurality of septa extend between opposed inner surfaces of said first and second flanges, on either side of the web, so as to define compartments. A plurality of mounting devices, including a novel preloaded small pipe strap, are adapted to frictionally engage a pair of septa and remain slightly in the web when mounting pipes of varying outer diameters, against one or more of said v-shaped cradles. The '887 universal pipe support and hanger system is typically attached to a pipe at a single point along each pipe's length. Thus, the '887 system is not suitable for preventing misalignment that can occur when concrete his poured into a form containing pipe work.

U.S. Pat. No. 5,125,619 issued Jun. 30, 1992 to Collins, describes a pipe support element that is releasably mounted on a top rim of a form board. The pipe support element supports a pipe away from the form board so concrete can be poured around the pipe. The pipe support element is monolithic and includes a rectangular base attached to the form board by a fastener, such as a nail, and comprises a C-shaped section that engages the pipe. A strap, such as a wire, is wound around the pipe and around the nail to further attach the pipe to the pipe support element. The pipe support element can be removed from the form board for re-use. The '619 pipe support element is unsuitable for keeping a pipe aligned correctly during a concrete pour operation.

Pipefix™ is used in lavatory rough-ins. The Pipefix™ holds and aligns ½" and ¾" supply lines to a waste pipe. Only 3-½" of wall clearance is required to mount the Pipefix™. The Pipefix™ comprises a support that is preslotted to hold apart 4", 6", and/or 8" piping. The Pipefix™ attaches to 1-⅜" through 6-⅝" O.D. vent or waste piping by means of a stainless steel band. The Pipefix™ comes in two material options: A-503 Polystyrene (yellow in color) and A-603 ABS (orange in color). The Pipefix™ relies on a fixed waste pipe to align other pipes. There is a need for a universal alignment apparatus that does not rely on a fixed waste pipe to align other pipes.

U.S. Publication No. 2003/0108130 A1 published Jun. 12, 2003 to Tucker, describes an apparatus for supporting the pipes of a plumbing system during the construction of a cement building structure. The '130 apparatus is attachable at one end to a form board and at another end to a pipe. The '130 apparatus attaches to one point along a pipe's length making the '130 device unsuitable for maintaining pipe alignment during a concrete pour.

U.S. Pat. No. 6,061,880 issued May 16, 2000 to Senninger, describes a fastener for securing one or more water supply lines to a pipe, such as a drain or vent pipe. The fastener includes a first resilient clamping element for engaging the pipe and a second resilient clamping element for engaging the water line. The second resilient clamping elements may be unitary with the first resilient clamping elements or selectively connected together by means of a connector. The elements of the '880 device are made of a resilient plastic material such as polyvinyl chloride, CPVC, or ABS by means of injection molding. While the '880 device has a role to play in securing one or more water supply lines to a pipe, such as a drain or vent pipe, the '880 device is not sufficiently rigid to prevent pipe work moving out of alignment during a concrete pour operation.

None of the above inventions and patents, taken either singly or in combination, is seen to describe the instant invention as claimed. Thus an apparatus solving the aforementioned problems is desired.

SUMMARY OF THE INVENTION

The invention is directed to an alignment and support device for supporting and maintaining correct alignment of one or more pipes or conduits inside a form board during a concrete pour operation. The device has at least two attachment points for holding a pipe or conduit, and at least one attachment bracket adapted to attach the alignment and support device to a form board. The two attachment points are preferably aligned to hold a pipe or conduit at two separate points along the pipe or conduit's length. Two attachment points are advantageous for securing the pipe work in place where the pipes are under great strain and pressure from concrete being poured over or around them. Accordingly, it is a principal object of the invention to provide an alignment and support device to support and maintain alignment of a pipe or conduit during a concrete pour operation. It is another object of the invention to provide an alignment and support device that holds a pipe at two places along the pipe's length to prevent pivoting of the pipe about either attachment point.

It is further object of the invention to provide an alignment and support kit capable of easy assembly by a construction worker in the field to hold at least one pipe or conduit in alignment.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
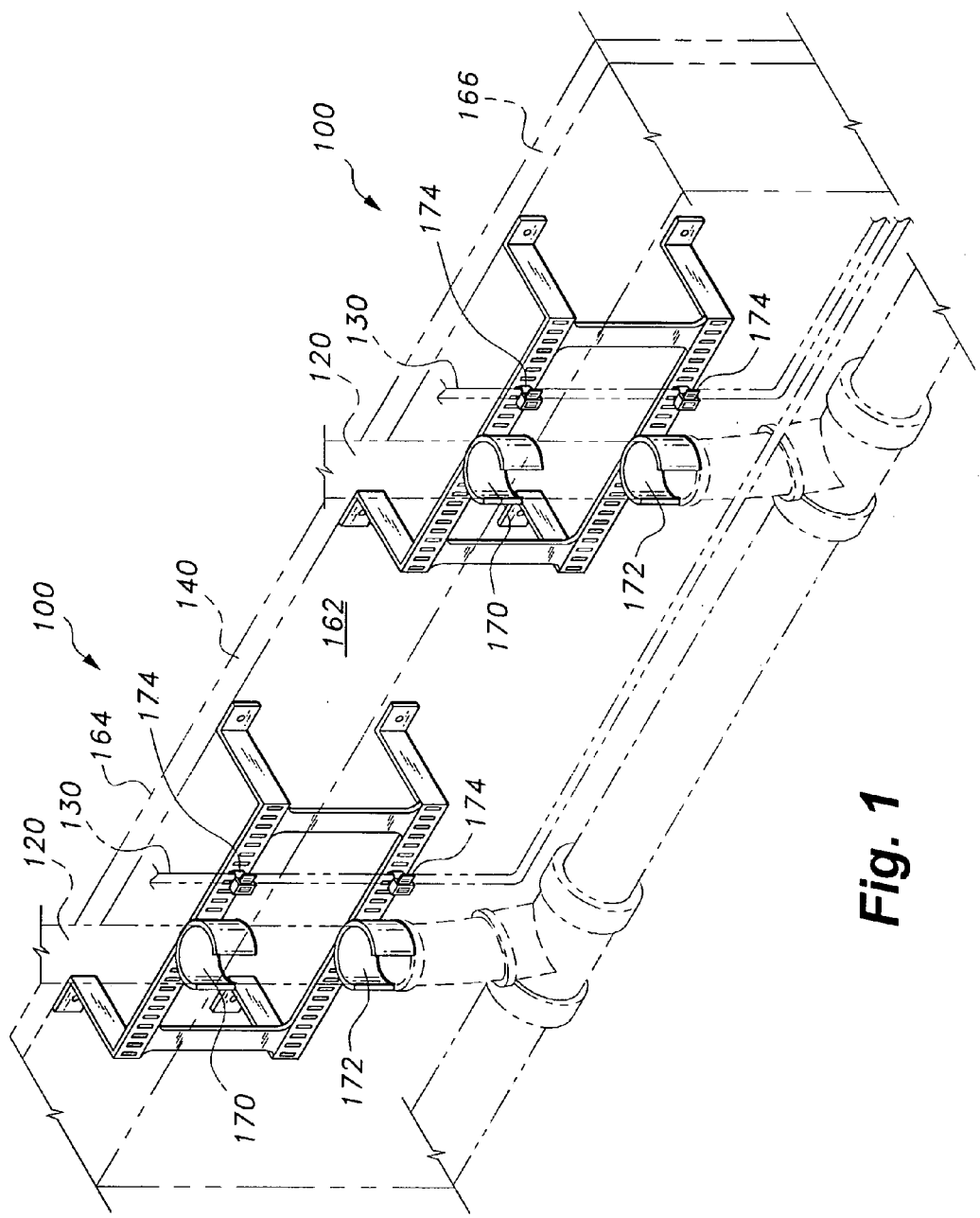
FIG. 1 is an environmental, perspective view of an alignment and support apparatus for aligning and supporting at least one pipe away from a form board, according to the present invention.

The present invention is directed to an alignment and support apparatus 100 for aligning and supporting at least one pipe 120 and the like during a concrete pour operation. More specifically, the alignment and support apparatus 100 keeps pipes 120 and/or conduits 130 aligned with respect to a form board 140 during a concrete pour operation. The terms "apparatus" and "device" are regarded as equivalent terms.

FIG. 1 shows a perspective view of an alignment and support apparatus 100 for aligning and supporting at least one pipe 120 and/or conduit 130, wherein the pipe 120 and/or conduit 130 are prevented from moving out of alignment during a later concrete pour operation. Form board 140 is shown comprising an inner surface 162, an outer surface 164, and a top rim 166. The form board may also include a bottom surface (not shown).

Still referring to FIG. 1, device 100 includes aligned pipe brackets 170 and 172, which are used to attach pipes 120. Conduits 130 are shown attached to the device 100 by at least one tie 174. Thus, pipes 120 and conduits 130 are attached at two points to the device 100 thereby preventing swiveling of an attached pipe 120 and/or conduit 130 about either attachment point during a concrete pour operation.

Figure 2A:
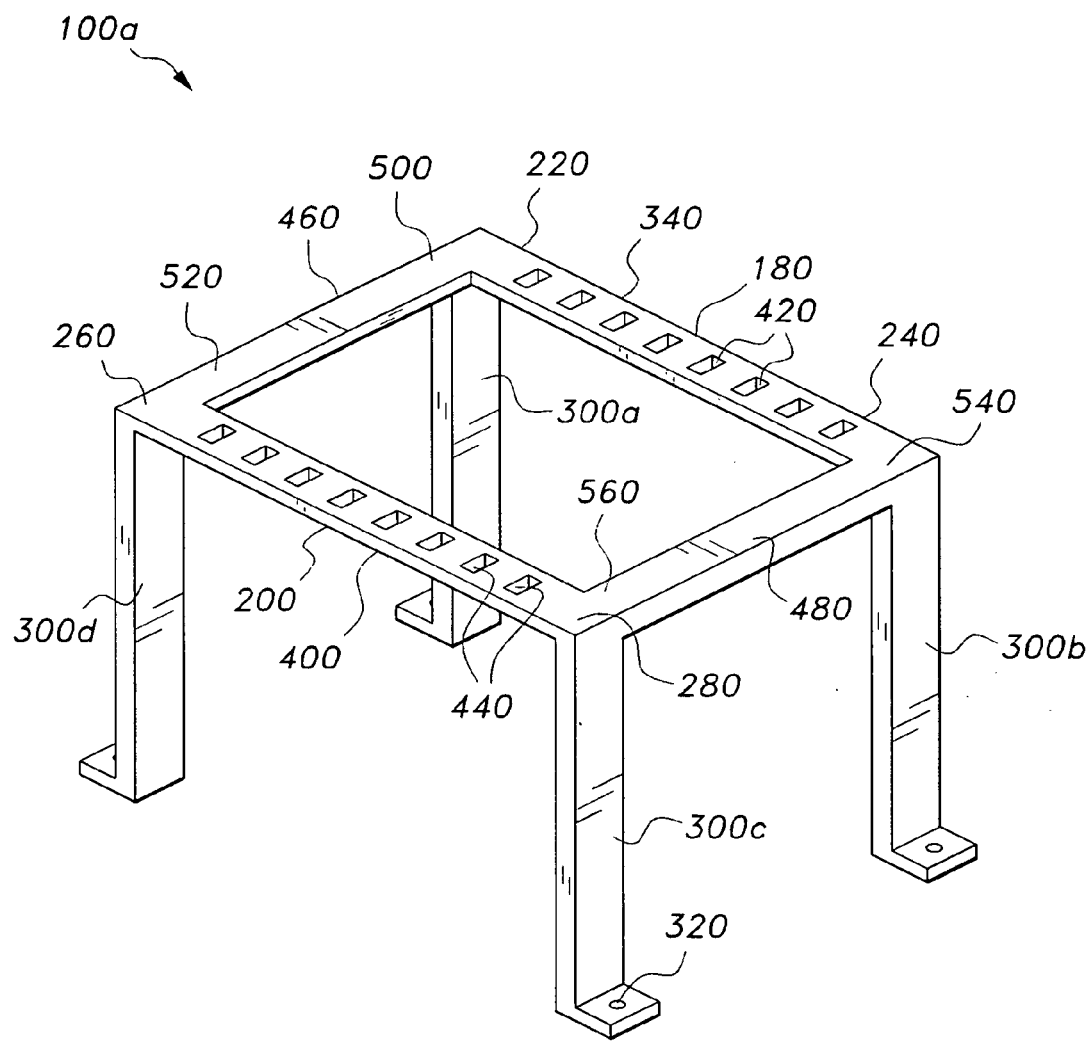
FIG. 2A is a perspective view of an alignment and support apparatus, according to the first embodiment of the invention.
Figure 3A:
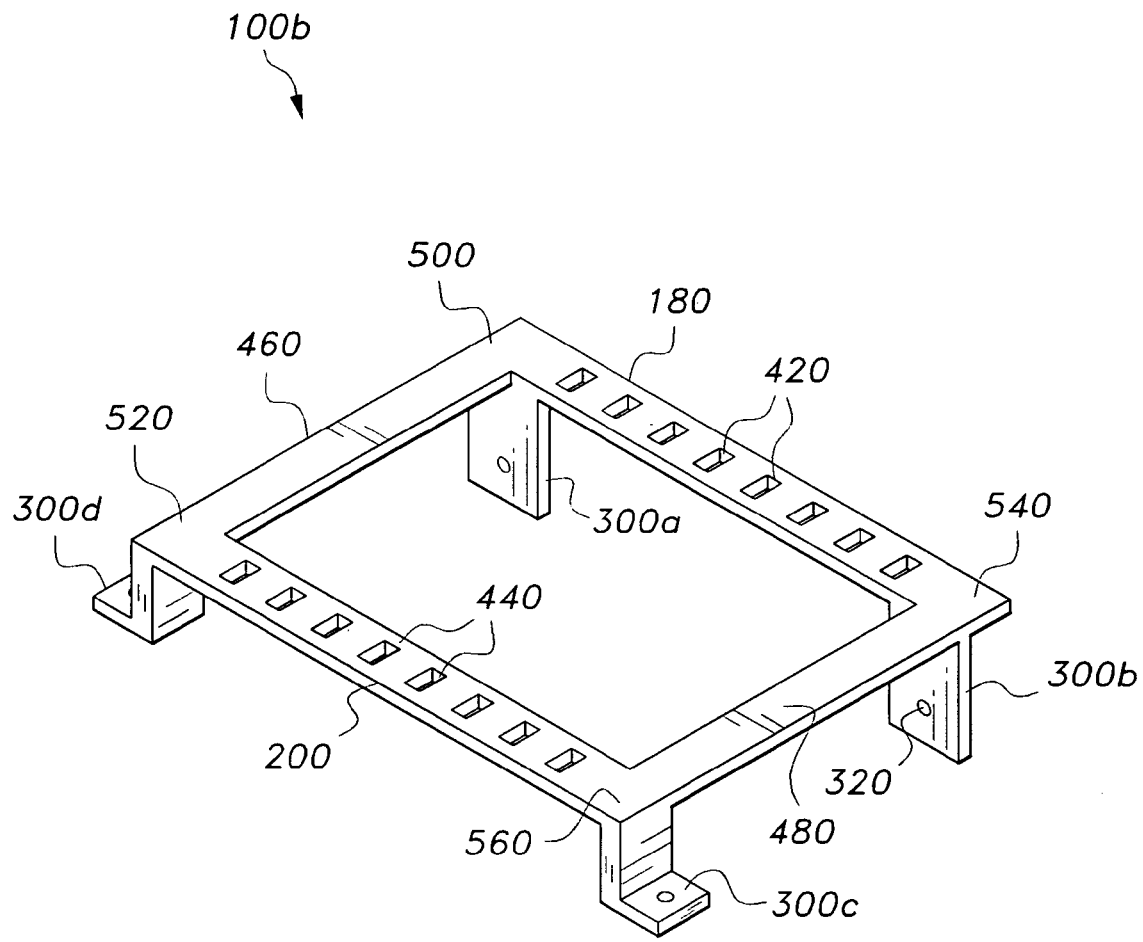
FIG. 3A is a perspective view of a variation of the alignment and support apparatus of FIG. 2A.

FIGS. 2A and 3A show a first embodiment of the alignment and support apparatus 100 (respectively represented by the alpha-numeric labels 100a and 100b), according to the invention. The device 100 includes first 180 and second 200 elongated support members with opposed ends 220, 240, 260, and 280 as shown in FIG. 2A. Opposed ends 220 and 240 define a first middle portion 340, and opposed ends 260 and 280 define a second middle portion 400. The middle portions 340 and 400 respectively define a first plurality of apertures 420 and a second plurality of apertures 440. The terms "plurality of apertures" and "array of apertures" are herein regarded as equivalent terms.

Still referring to FIGS. 2A and 3A, first 180 and second 200 support members are connected to each other by means of first 460 and second 480 elongated alignment members. Specifically, first elongated alignment member 460 has opposed ends 500 and 520 that are respectively connected to support members 180 and 200, and second elongated alignment member 480 has opposed ends 540 and 560 that are respectively connected to support members 180 and 200. The alignment members 460 and 480 can be parallel with respect to each other to form a perpendicular angle with respect the first and second support members 180 and 200 such that the first 420 and second 440 arrays of apertures line up. However, it will be understood that the alignment members 460 and 480 may not be parallel, i.e., the only important issue is that at least some of the apertures in arrays 420 and 440 line up to permit a construction worker to tie pipes 120 and conduits 130 to the device 100 using, e.g. ties 174 (e.g., see FIG. 3B and description below).

Figure 3B:
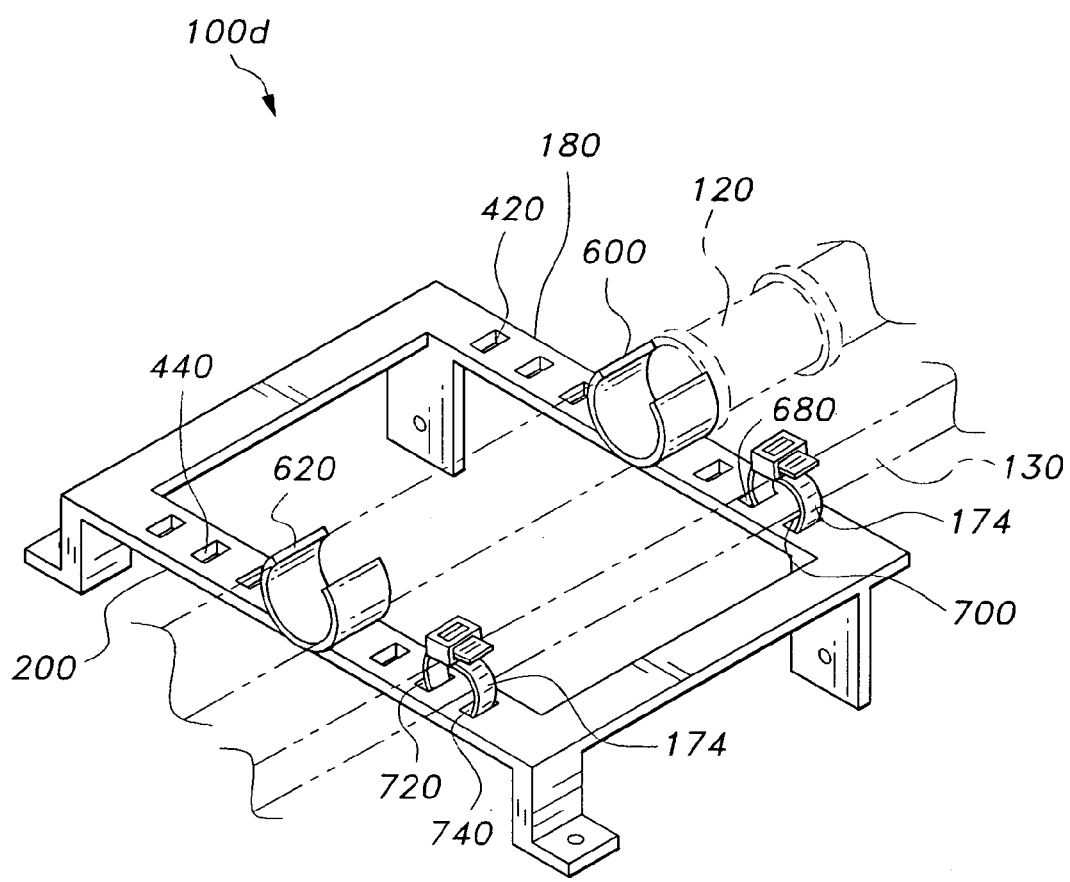
FIG. 3B is a perspective view of a variation of the alignment and support apparatus of FIG. 2B.

Referring to FIG. 3B, ties 174 can be threaded through selected apertures within the first and second pluralities of apertures 420 and 440, such as 680, 700, 720 and 740, to attach, for example, a conduit 130 (shown in phantom in FIG. 3B) to support members 180 and 200. It will be understood that more than one pipe can be secured to the support members 180 and 200. In addition, where a pipe or conduit needs to be held steady at a selected angle this can be achieved by threading ties 174 through selected apertures in arrays 420 and 440 for attaching an angled pipe 120 and/or conduit 130.

Figure 2B:
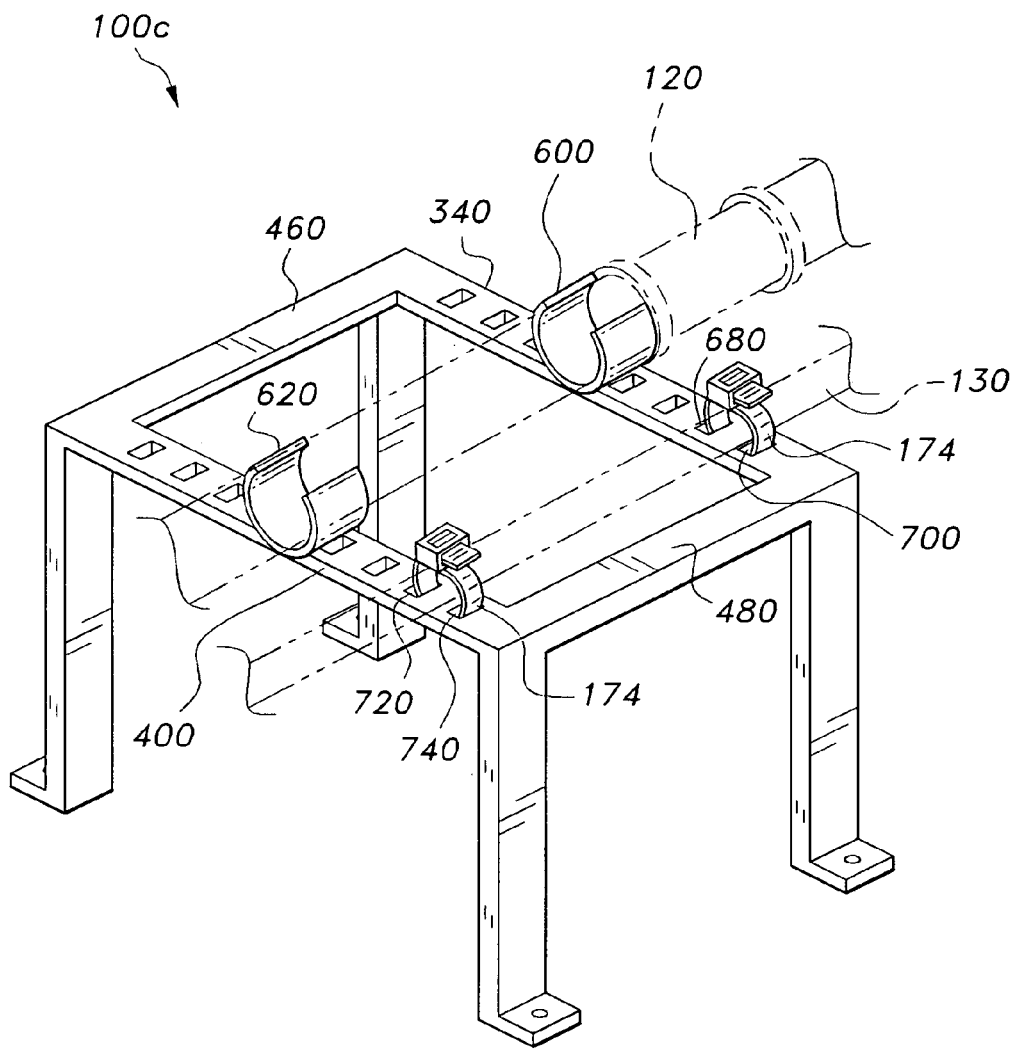
FIG. 2B is a perspective view of an alignment and support apparatus, according to the second embodiment of the invention.

Still referring to FIGS. 2B and 3B, support member ends 220, 240, 260 and 280 are shown fashioned into a form board attachment bracket 300 (represented by alpha-numeric labels 300*a*, 300*b*, 300*c*, and 300*d*). The form board attachment bracket 300 provides a convenient offset with respect to the form board 140. The form board attachment brackets 300*a*, 300*b*, 300*c*, and 300*d* define a form board attachment aperture 320 (represented by alpha-numeric labels 320*a*, 320*b*, 320*c*, and 320*d*). It will be understood that the form board attachment apertures 320 may be replaced with any suitable form board attachment mechanism such as an integral spike 960 (see, for example, FIGS. 5 and 6); in FIG. 7 the device 100 (represented using label "100*f*") employs a mix of attachment apertures 320 (on form board attachment brackets 300*j* and 300*k*) and spikes 960 (on form board attachment brackets 300*m* and 300*n*).

FIGS. 2B and 3B show a second embodiment of the alignment and support apparatus 100 (respectively represented by the alpha-numeric label 100*c* and 100*d*). In this embodiment the first 340 and second 400 middle portions respectively comprise first 600 and second 620 outward facing pipe brackets. The pipe brackets 600 and 620 are aligned with respect to each other to attach a pipe 120 at two positions along the pipe's length. The pipe brackets 600 and 620 may be in the form of a snap-in wherein a pipe 120 is snapped into the brackets 600 and 620 thus providing two separate grip points such that a pipe 120 cannot easily swivel about either bracket 600 and 620. This is an important improvement over the known prior art where a single pipe grip point is not sufficient to prevent swiveling of an affixed pipe during a concrete pour operation. It will be understood that the position and number of 600 and second 620 outward facing pipe brackets may vary.

Figure 4A:
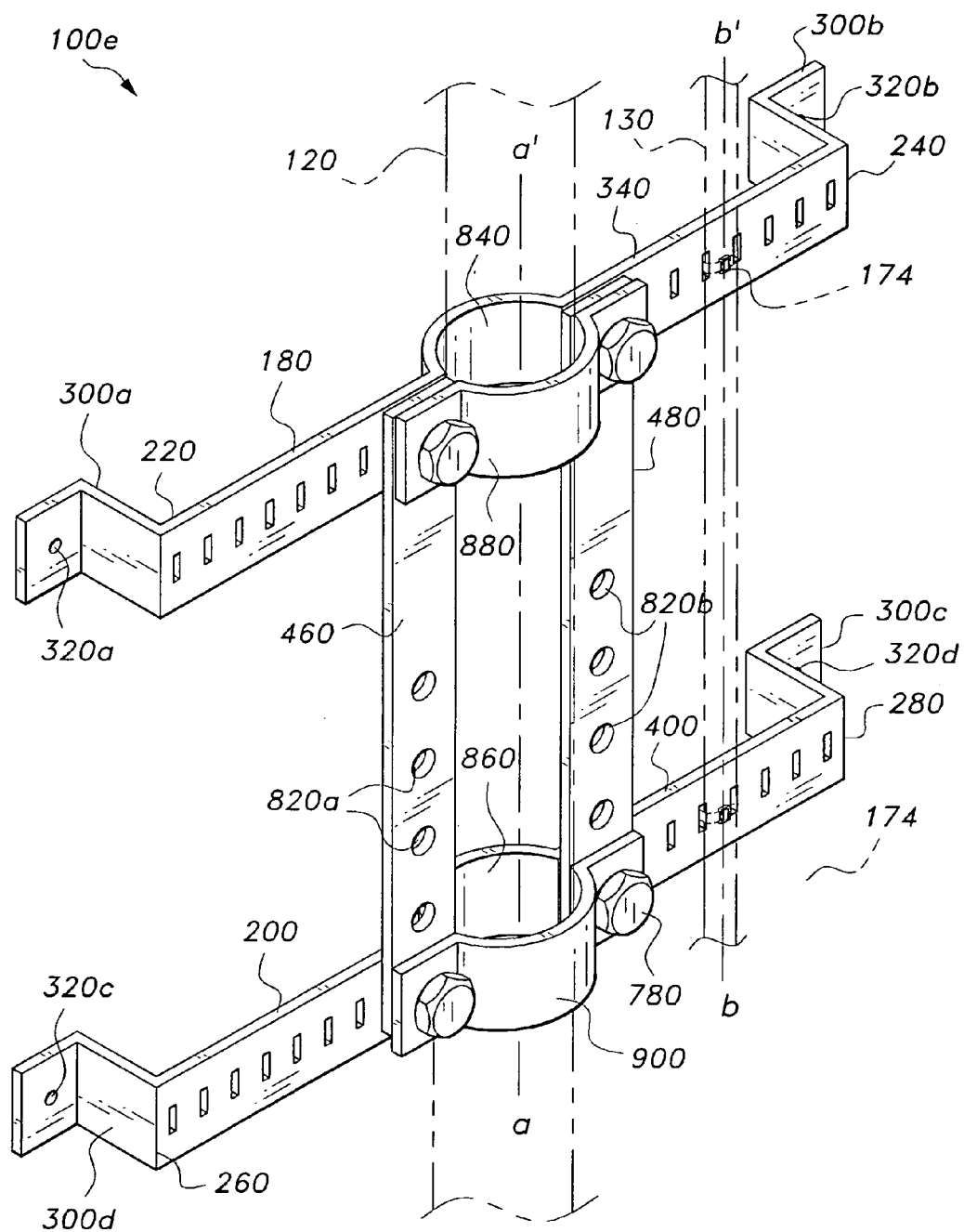
FIG. 4A is a perspective view of an alignment and support apparatus in assembled form, according to the third embodiment of the invention.
Figure 4B:
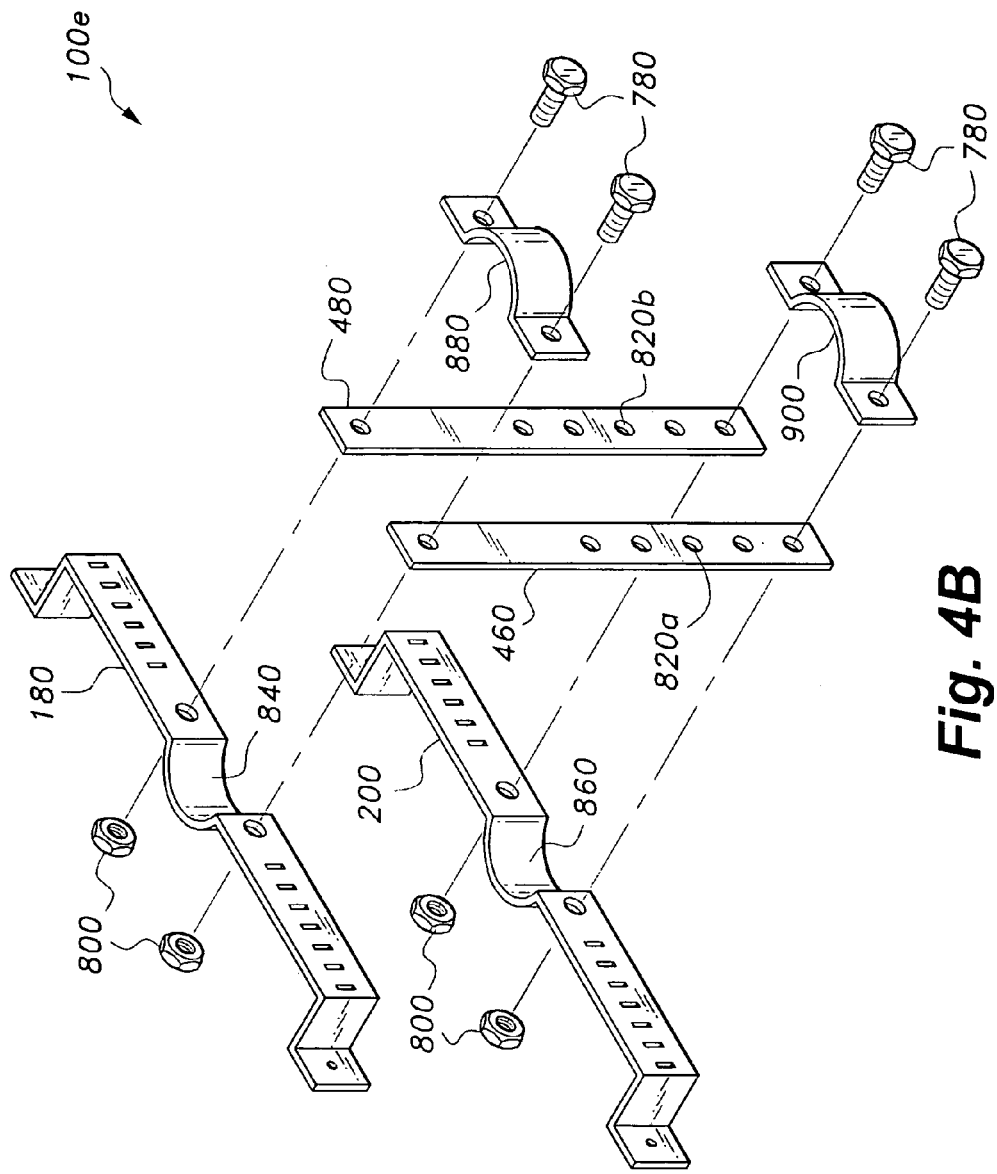
FIG. 4B is an exploded view of the alignment and support apparatus of FIG. 4A.

FIGS. 4A and 4B show a third embodiment of the invention wherein the alignment and support apparatus 100 (represented by the alpha-numeric label 100*e*) is made up of attachable components, i.e., the apparatus 100*e* is a kit. Thus, a construction worker using commonly available tools, such as an adjustable wrench, can assemble the kit 100*e* from the set of components shown in FIGS. 4A and 4B. Specifically, the support members 180 and 200 and alignment members 460 and 480 are shown bolted together using bolts 780 and complementary nuts 800. In this embodiment of the invention, the alignment members 460 and 480 define a plurality of corresponding connecting apertures 820*a* and 820*b*, respectively. Thus, selecting specific apertures 820*a* and 820*b* to bolt through can vary the distance between support members 180 and 200.

Still referring to FIGS. 4A and 4B, middle portions 340 and 400 respectively include at least one recessed inward curved surface 840 and 860 dimensioned to accommodate a section of a pipe 120, e.g., the diameter of the inward curved surfaces are chosen to be sufficient to accommodate the exterior surface of a pipe 120. Curved surfaces 840 and 860 are preferably aligned one above the other; specifically, support members 180 and 200 are connected to each other by means of alignment members 460 and 480 such that inward curved surfaces 840 and 860 line up. A pipe 120 may be tied to the inward surfaces 840 and 860 using ties threaded through selected apertures on each side of the curved surfaces 840 and 860. However, it is preferred that opposite facing complementary curved brackets 880 and 900 are affixed as shown in FIG. 4B using suitable fasteners such as nuts and bolts as shown in FIG. 4A to provide a tight fit around a pipe 120 (shown in phantom).

Pipe 120 and conduit 130 respectively possess central longitudinal axes: a–a' and b–b' (see FIG. 4A). The recessed inward curved surfaces 840 and 860 are preferably recessed into member 180 to the extent that the central longitudinal axes a–a' and b–b' are flush, i.e., occupy the same central axis plane y–y' (see FIG. 4C where axes a–a' and b–b' are end on and respectively represented by numerals "134" and "136"). Thus, device 100*e* shown in FIGS. 4A, 4B and 4C enables a plumber to keep pipes and conduits in the same central axis plane; this feature is of use, for example, in situations where pipes and conduits are located and supported inside narrow horizontal or vertical wooden forms.

Figure 4C:
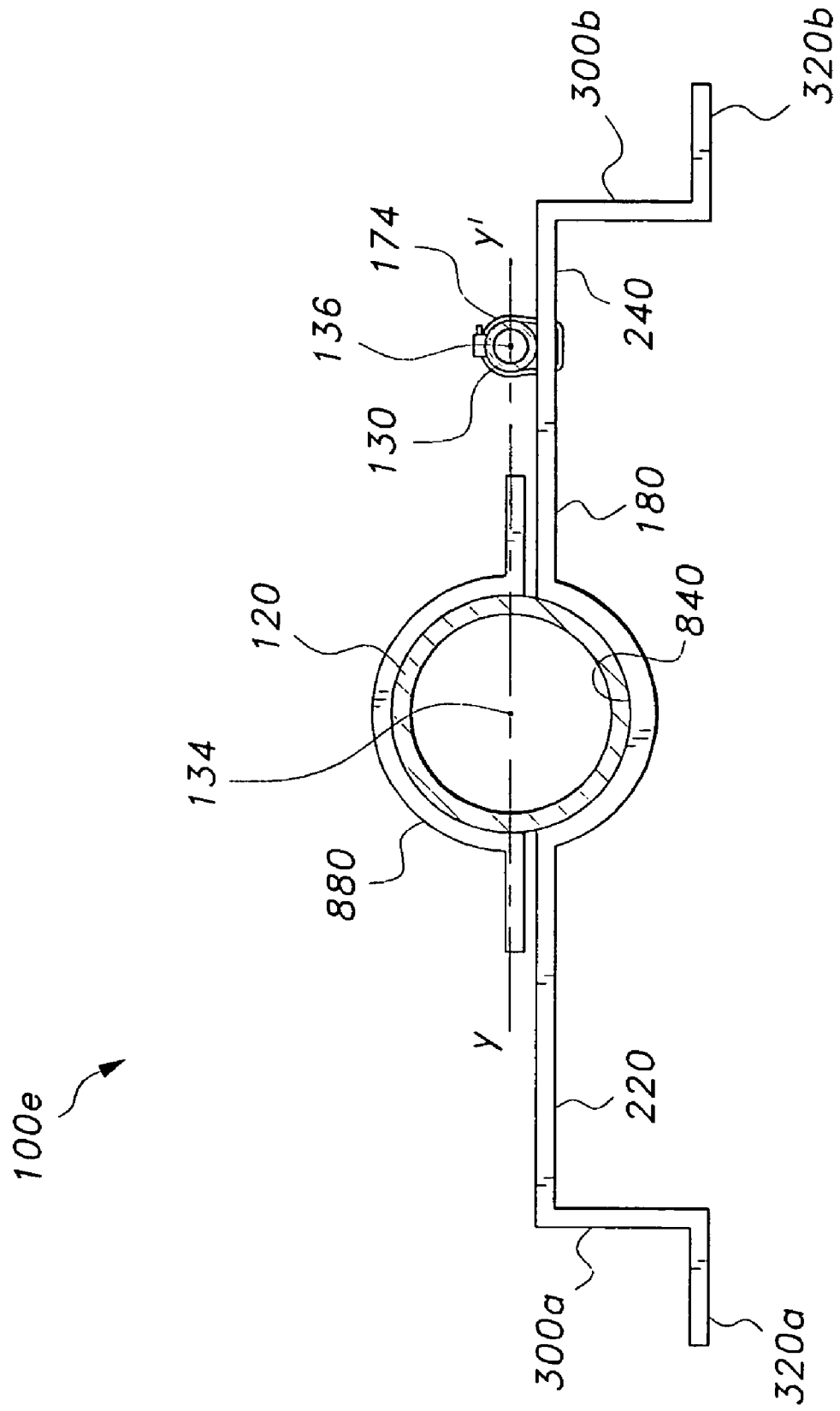
FIG. 4C is an end-on view of the alignment and support apparatus of FIG. 4A.

It should be understood that the inward curved surfaces 840 and 860, and the corresponding opposite facing complementary curved brackets 880 and 900, are expressly not limited to the device 100*e* as depicted in FIGS. 4A, 4B and 4C. For Example, the inward curved surfaces 840 and 860 could be incorporated respectively into the first 180 and second 200 elongated support members of FIGS. 1, 2A and 3A to allow pipes and conduits to be attached in the same central axis plane as described above with respect to FIGS. 4A and 4C.

Still referring to FIGS. 4A and 4B, support member ends 220, 240, 260 and 280 are respectively fashioned into a form board attachment bracket 300 (respectively represented by alpha-numeric labels 300*a*, 300*b*, 300*c*, and 300*d*). The form board attachment brackets 300*a*, 300*b*, 300*c*, and 300*d* define a form board attachment aperture 320 (represented by alpha-numeric labels 320*a*, 320*b*, 320*c*, and 320*d*). The form board attachment bracket 300 provides a convenient offset with respect to the form board 140 (see FIG. 1) such that inward facing curved surfaces 840 and 860 are accommodated without clashing against a surface of the form board 140. For example, if a construction worker assembled and attached device 10*e* to inner form surface 162 (see FIG. 1) then curved surfaces 840 and 860 would be accommodated without pressing upon surface 162.

Figure 5:
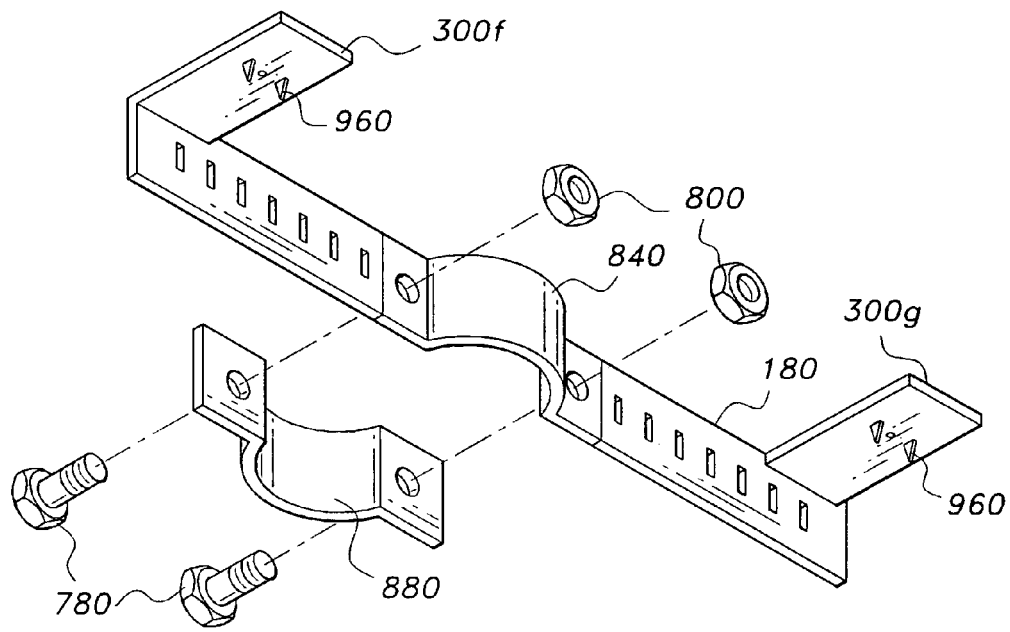
FIG. 5 is a perspective view of a first support member with integrated spikes.
Figure 6:
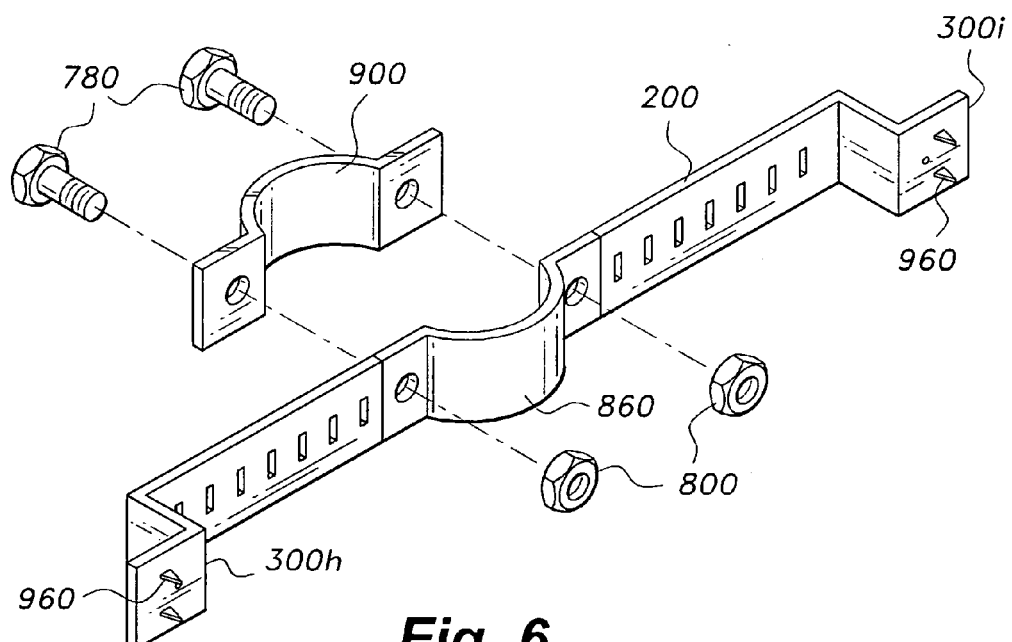
FIG. 6 is a perspective view of a second support member with integrated spikes.
Figure 7:
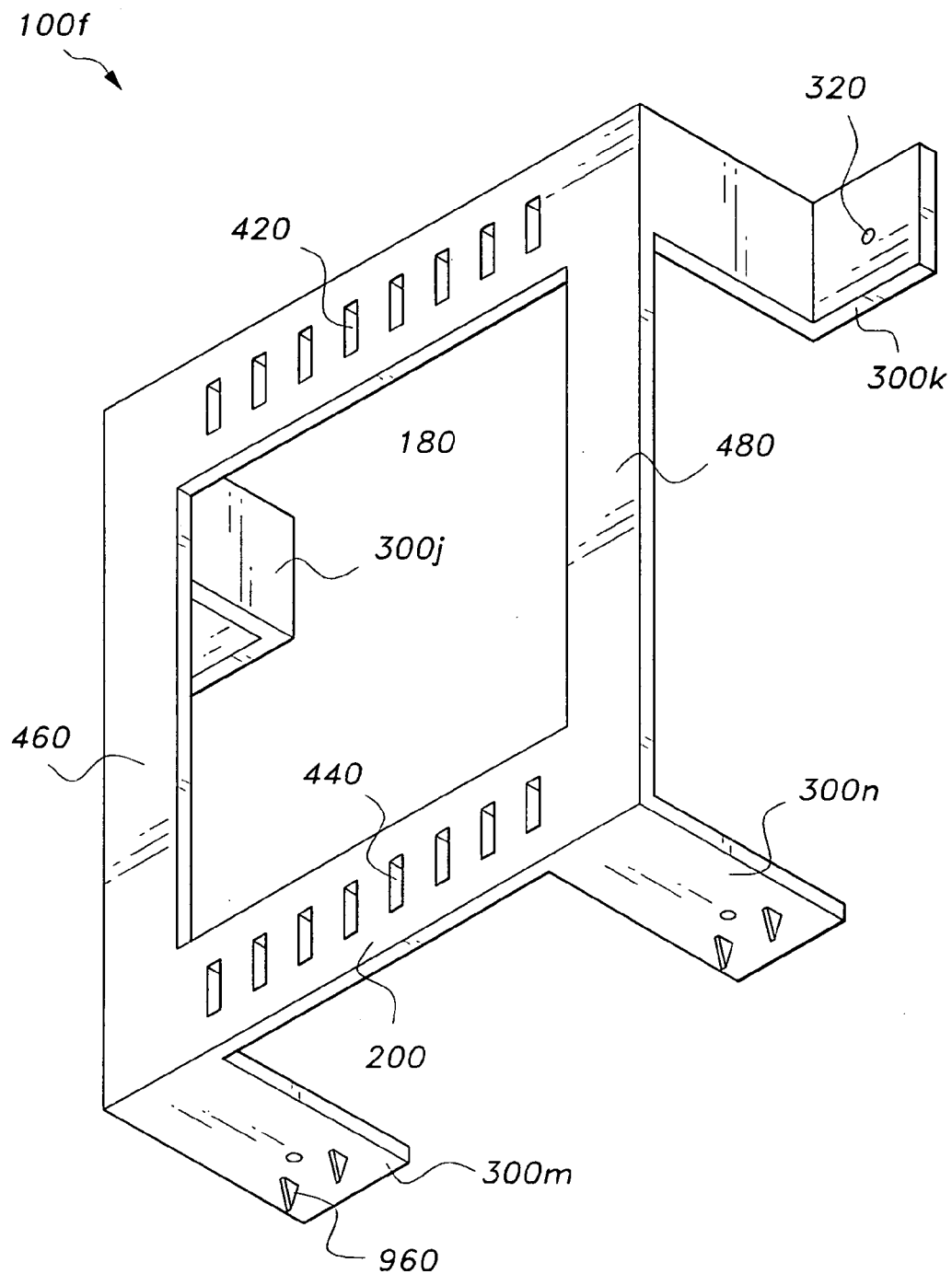
FIG. 7 is a perspective view of an alignment and support apparatus adapted to attach to the bottom and interior sides of a wooden form.

With respect to FIGS. 5 and 6, integral spikes 960 replace form board attachment apertures 320. For example, form board attachment brackets 300*f* and 300*g* (FIG. 5) define spikes 960 and are designed to attach to top rim 166 of wooden form 140. Form board attachment brackets 300*h* and 300*i* with integral spikes 960 can attach, for example, to inner surface 162. Form board attachment brackets 300*h* and 300*i* are suitable for attaching to the floor of a wooden form board 140.

It will be understood that bolts 780 and complementary nuts 800 may be replaced with any suitable fastener such as conventional rivets, pop-rivets, and snap-in plastic rivets. It will also be understood that the position and number of form attachment brackets 300 may vary without detracting from the spirit of the invention. In addition, the dimensions of the brackets 300 may vary to accommodate the amount of desired offset off form board 140; for example, the brackets 300 shown in FIGS. 2A and 3A are longer and thus provide a greater offset than those shown in FIGS. 3A and 3B.

Figure 8A:
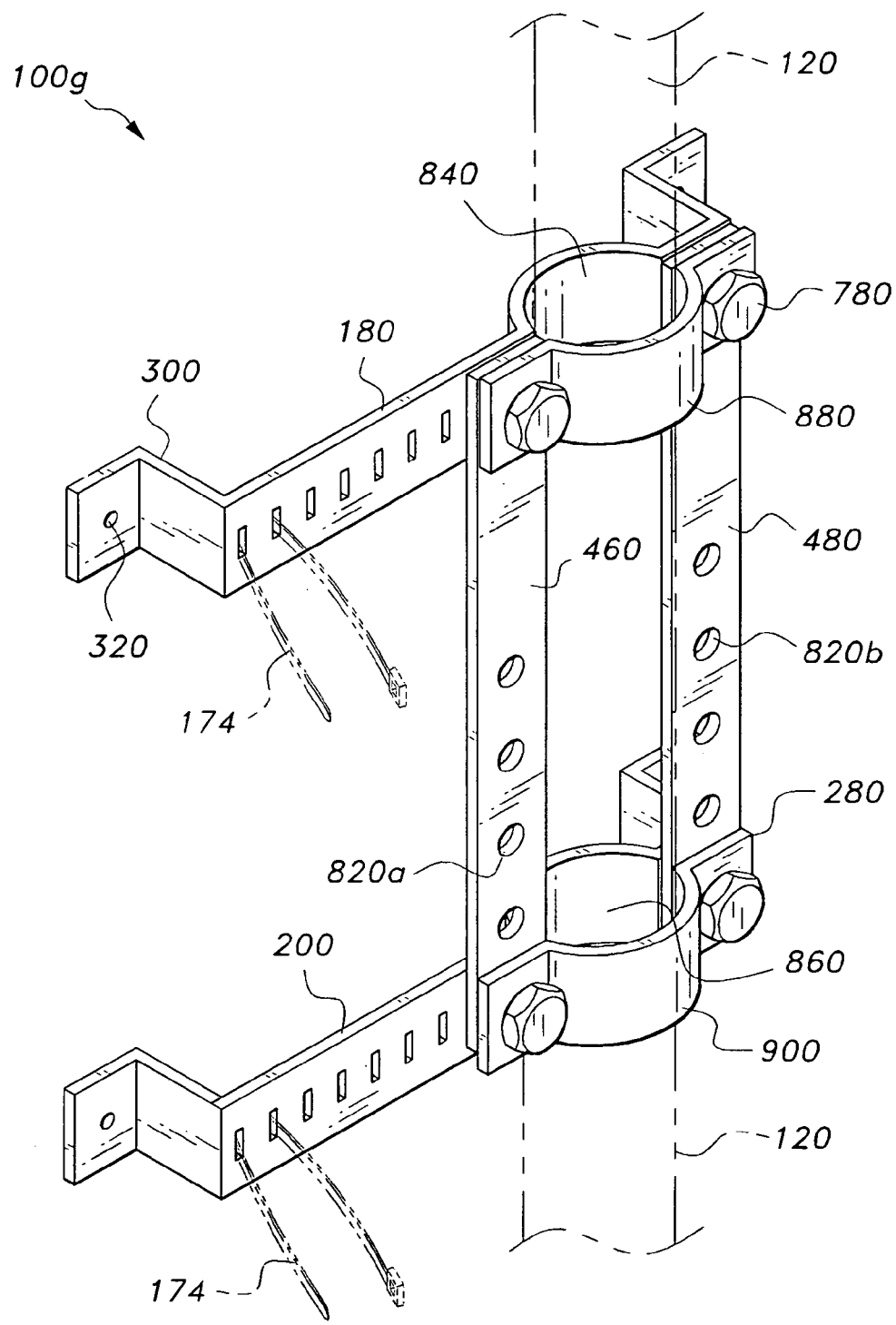
FIG. 8A is a perspective view of a variation of the alignment and support apparatus of FIG. 4A, according to the first embodiment of the invention.
Figure 8B:
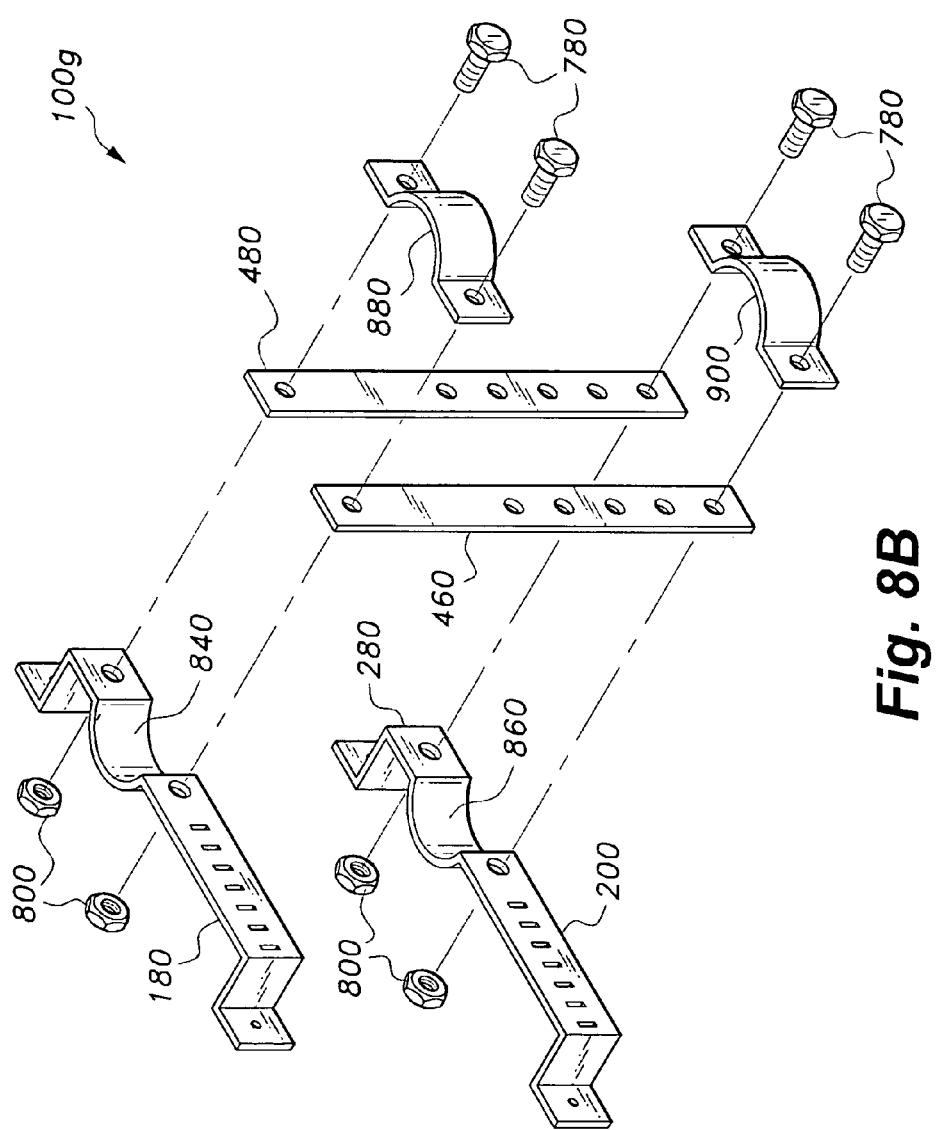
FIG. 8B is an exploded view of the alignment and support apparatus of FIG. 8A.

In addition, the position and number of inward curved surfaces 840 and 860 (and by default opposite facing complementary curved brackets 880 and 900) can vary as depicted in FIGS. 4A and 4B where curved surfaces 840 and 860 are respectively located about half way between the opposed ends of the support members 180 and 200 in contrast to device 100*g* (FIGS. 8A and 8B) where curved surfaces 840 and 860 are respectively located close to support member ends 240 and 280. The recessed inward curved surfaces 840 and 860 of FIGS. 8A and 8B are preferably recessed to the extent that a pipe fitted to the recessed surfaces 840 and 860 occupy the same plane as conduits 130 tied to the elongated support members 180 and 200.

Thus, the alignment and support device 100 comprises at least two attachment points, such as brackets 600 and 620 or inward curved surface 840 and 860 (and complementary brackets 880 and 900), for holding a pipe 120 or conduit 130, and at least one attachment bracket 300, wherein the at least one attachment bracket 300 is capable of attaching the alignment and support device 100 to a form board 140. The presence of two attachment points on device 100 helps prevent pivoting about a single attachment point as found in the prior art. It is preferred that the at least two attachment points are aligned, but the attachment points may not be aligned to cover instances where the pipe 120 or conduit 130 are angled, e.g. branch off at an angle from a vertical pipe.

Device 100 can be made of any suitable material such as a plastic, metal, alone or in combination. For example, the device 100*b* shown in FIG. 3A can be made of molded plastic in one piece by an injection molding process. The component parts shown in FIGS. 4B and 8B may be individually made of a metal such as lightweight aluminum, copper or steel, or made of, for example, ABS plastic (ABS, acrylonitrile-butadiene-styrene) or PVC (polyvinylchloride, e.g., 0.25 inch thick PVC). If made of metal, device 100 may be covered in a suitable coating to prevent unwanted interactions between the device 100 and metal pipes or conduits made of a dissimilar metal. Alternatively, the device 100 may be made principally of a metal but with some parts made of plastic, e.g., the pipe brackets 170 and 172 can be made of plastic while the support members 180 and 200, and alignment members 460 and 480 made of metal. Suitable plastics include (but are not limited to): reinforced molded plastic (for example, as described in U.S. Pat. No. 5,199,131 issued Apr. 6, 1993 to Harris), and ABS.

It is to be understood that the present invention is not limited to the embodiments described above, but encompasses any and all embodiments within the scope of the following claims.

I claim:

1. An alignment and support device for supporting and maintaining correct alignment of at least one pipe or conduit inside a form board during a concrete pour operation, comprising:
   a first elongated support member and a second elongated support member, wherein the first and second support members each have opposed ends respectively defining first and second middle portions, wherein the first and second middle portions respectively comprise a first and a second plurality of apertures, wherein the first and second middle portions respectively comprise first and second recessed inward curved surfaces, wherein the first and second recessed inward curved surfaces are aligned, and
   a first elongated alignment member and a second elongated alignment member, each alignment member having respective opposed ends attachable to the first and second support members such that at least some of the apertures in each support member line up,
   wherein at least one of the support members and alignment members comprise at least one attachment bracket capable of attaching the alignment and support device to a form board, and
   whereby ties can be threaded through selected apertures in the middle positions to attach and align a conduit thereto, and further whereby the curved surfaces enable a pipe to be attached thereto such that the central longitudinal axes of an attached pipe and conduit are in the same plane with respect to each other.

2. The alignment and support device of claim 1, wherein first and second opposite facing complementary curved brackets are respectively fitted opposite the first and second inward curved surfaces for providing, where required, a tight fit around a pipe.

3. An alignment and support kit adapted for assembly by a construction worker for supporting and maintaining correct alignment of at least one pipe or conduit with respect to a form during concrete pour operation, comprising:
   a first elongated support member having opposed ends defining a first middle portion, wherein the first middle portion defines a first array of apertures;
   a second elongated support member having opposed ends defining a second middle portion, wherein the second middle portion defines a second array of apertures, wherein the first and second middle portions respectively comprise first and second outward facing pipe brackets, wherein the pipe brackets are aligned with respect to each other such that a pipe can be aligned and attached thereto; and
   first and second alignment members, each alignment member having respective opposed ends attachable to the first and second support members such that at least some of the apertures in the first and second aperture arrays line up, wherein at least one of the support members and alignment members comprise at least one attachment bracket capable of attaching the assembled kit to a form board; and
   whereby ties can be threaded through selected apertures to attach a pipe or conduit to both support members to prevent unwanted movement of an attached pipe or conduit during a concrete pour operation.

4. The alignment and support kit of claim 3, wherein a plurality of nuts and bolts fasten the alignment members to the first and second support members.

5. An alignment and support kit adapted for assembly by a construction worker for supporting and maintaining correct alignment of at least one pipe or conduit with respect to a form during concrete pour operation, comprising:
   a first elongated support member having opposed ends defining a first middle portion, wherein the first middle portion defines a first array of apertures;
   a second elongated support member having opposed ends defining a second middle portion, wherein the second middle portion defines a second array of apertures, wherein the first and second middle portions each define at least one inward curved surface dimensioned to accommodate a pipe, wherein the curved surfaces are aligned and enable the at least one pipe to be aligned and attached thereto; and
   first and second alignment members, each alignment member having respective opposed ends attachable to the first and second support members such that at least some of the apertures in the first and second aperture arrays line up, wherein at least one of the support members and alignment members comprise at least one attachment bracket capable of attaching the assembled kit to a form board; and
   whereby ties can be threaded through selected apertures to attach a pipe or conduit to both support members to prevent unwanted movement of an attached pipe or conduit during a concrete pour operation.

6. An alignment and support kit adapted for assembly by a construction worker for supporting and maintaining correct alignment of at least one pipe or conduit with respect to a form during concrete pour operation, comprising:

a first elongated support member having opposed ends defining a first middle portion, wherein the first middle portion defines a first array of apertures;

a second elongated support member having opposed ends defining a second middle portion, wherein the second middle portion defines a second array of apertures, wherein the first and second middle portions each define at least one inward curved surface dimensioned to accommodate a pipe, and wherein the kit further comprises an opposite facing complementary curved bracket capable of being affixed opposite each inward curved surface to fit around a pipe; and first and second alignment members, each alignment member having respective opposed ends attachable to the first and second support members such that at least some of the apertures in the first and second aperture arrays line up, wherein at least one of the support members and alignment members comprise at least one attachment bracket capable of attaching the assembled kit to a form board; and whereby ties can be threaded through selected apertures to attach a pipe or conduit to both support members to prevent unwanted movement of an attached pipe or conduit during a concrete pour operation.

7. The alignment and support kit of claim 6, wherein the first and second elongated alignment members each define a plurality of apertures.

* * * * *